United States Patent Office 2,743,210
Patented Apr. 24, 1956

2,743,210

XANTHOGEN AND DITHIOCARBONYL TETRASULFIDES AS PESTICIDES

Robert H. Jones, Irvington, and Silvio L. Giolito, New York, N. Y., assignors to Stauffer Chemical Company, a corporation of Delaware No Drawing. Application December 24, 1952,
Serial No. 327,922

7 Claims. (Cl. 167—30)

This invention relates to a novel group of pesticide compositions and particularly relates to the use of xanthogen and dithiocarbonyl tetrasulfides as pesticides.

The compounds of the present invention which have found utility as pesticides have the following general formula:

$$(RX\overset{S}{\underset{\|}{C}}S_2)_2$$

In this formula, X is oxygen or sulfur and each R represents an organic radical which may be an aliphatic radical having from 1 to 18 carbon atoms, a cycloparaffin radical, an aryl radical or an aralkyl radical, any of which may contain further substituents such as halogen atoms and may have an organic radical linked to R by an oxygen bridge. Those compounds wherein X is oxygen are xanthyl disulfides and those compounds wherein X is sulfur are trithiocarbonyl disulfides. The preferred compounds are those in which R is an aliphatic radical of from 1 to 8 carbon atoms, saturated or unsaturated with either a straight or branched chain.

Typical compounds falling within the scope of this invention include the following. (To facilitate reference to the compounds throughout the balance of the specification, code numbers have been assigned to these compounds as listed below.)

Xanthogen tetrasulfides 506 methyl xanthogen tetrasulfide
553 n-propyl xanthogen tetrasulfide
468 isopropyl xanthogen tetrasulfide
470 n-octyl xanthogen tetrasulfide
593 sec octyl xanthogen tetrasulfide
566 allyl xanthogen tetrasulfide

Dithiocarbonyl tetrasulfides 474 tert dodecyl dithiocarbonyl tetrasulfide
473 tert butyl dithiocarbonyl tetrasulfide.

Although the method of preparation of the compounds does not form a part of the present invention, it may be mentioned that the compounds may be readily prepared by the reaction between a salt, such as the potassium salt, of the desired xanthate or trithiocarbonate with sulfur chloride, according to the following scheme:

$$2R-O-\overset{S}{\underset{\|}{C}}-SK + S_2Cl_2 \longrightarrow (R-O-\overset{S}{\underset{\|}{C}}-S_2)_2 + 2KCl$$

The compositions of the present invention have been extensively tested as fungicides, insecticides, nematocides and acaracides. The method of conducting these tests and the data obtained from the tests are set forth below.

Agar plate test

In testing compounds for fungitoxicity in this method, the compound is dispersed evenly through 20 Nl of warm potato dextrose agar in a petri dish. A series of plates containing various concentrations of the compound are prepared for each fungus species used. When the agar has cooled and solidified the center of each plate is seeded with a few spores of the desired fungus. After seven days' incubation in the dark under controlled temperatures, the diameter of the fungus colony on each plate is measured and the relationship between the growth on each plate and that of an untreated but seeded control plate is recorded as percent control (or percent inhibition of growth). When applied to the compounds of the present invention, the following data were obtained:

Plate test

| Compound | p. p. m. A. niger | | | | p. p. m. S. fructicola | | | | p. p. m. Stemphylium sp. | | | |
|---|---|---|---|---|---|---|---|---|---|---|---|---|
| | 500 | 100 | 50 | 25 | 500 | 100 | 50 | 25 | 500 | 100 | 50 | 25 |
| 506 | 100 | 100 | 43 | 26 | 100 | 100 | 100 | 100 | 100 | 100 | 100 | 100 |
| 553 | 83 | 83 | 73 | 50 | 83 | 83 | 67 | 50 | 78 | 51 | 49 | 35 |
| 468 | 61 | 51 | 37 | 35 | 75 | 35 | 25 | 25 | 79 | 69 | 62 | 55 |
| 470 | 22 | 4 | | | 100 | 50 | 50 | 25 | 38 | 7 | 3 | |
| 593 | 12 | 5 | | | | 20 | 9 | 7 | 19 | | | |
| 566 | 100 | 100 | 75 | 42 | 100 | 100 | 100 | 100 | 100 | 100 | 100 | 52 |
| 474 | 30 | 13 | | | 65 | 35 | 20 | | | | | |

Pinto bean tests

Pinto bean plants sprouted and grown seven days in a bottom-heated sand bed in the greenhouse are potted two plants per 3" pot. Three days after transplanting, the terminal growth is pinched from each plant, leaving the two primary leaves.

The chemicals which are to be tested are sprayed on both the upper and lower surfaces of the primary leaves as an aqueous dispersion. A small quantity of wetting agent is included in the dispersant (distilled water), and care is taken to assure small particle size of the test compound.

After the deposit has dried, duplicate pots of plants from each concentration are inoculated with the test fungi, Uromyces phaseoli (bean rust) and Erysiphe polygoni (bean powdery mildew). The plants inoculated with mildew are placed directly in the greenhouse, while the rust-inoculated plants are incubated in a high-humidity chamber for 18 hours before removal to the greenhouse.

Readings of control are taken 10 days following spraying and inoculation and are expressed as per cent control as compared with untreated checks. The following data were obtained:

| Compound | Rust, p. p. m. | | | Mildew, p. p. m. | | |
|---|---|---|---|---|---|---|
| | 1,000 | 500 | 100 | 1,000 | 500 | 100 |
| 506 | 100 | 95 | | 40 | | |
| 468 | | | 73 | | | |
| 470 | 88 | 52 | 10 | | | |
| 593 | 75 | 50 | 25 | 100 | 100 | 75 |
| 566 | 100 | 90 | 75 | 100 | 90 | 75 |

Insect test

Acetone solutions of the compounds are dispersed in water that has 0.015% Vatsol OT wetting agent and 0.005% Methocel (25 cps.) dissolved in it. The water dispersion of the compound is sprayed onto the insects with a Devillbis hand sprayer at a concentration of 0.5%. The insects are held in the sprayed cages for 72 hours. Mortality counts are made at 72 hours and the results reported as percentage of insects killed. The following data were obtained:

| Compound | Housefly | Amer. Roach | Milkweed Bug | Confused Flour Beetle | Bean Aphid |
|---|---|---|---|---|---|
| 506 | 28 | | | 28 | 40 |
| 553 | 100 | 40 | 30 | 100 | 65 |
| 468 | 96 | 10 | 10 | 100 | 90 |
| 470 | 4 | | | 85 | 100 |
| 593 | | 20 | | 21 | |
| 566 | 100 | 60 | 30 | 100 | |
| 597 | 8 | | | 14 | |

*Fumigation test*

*Fungicidal in vitro tests.*—Glass microbeakers containing 100 mg. of the test compound are placed in petri dishes which contain 20 ml. potato dextrose agar. Spores of *Aspergillus niger* are seeded on the surface of the agar and allowed to germinate and develop normally. After seven days growth in an atmosphere in which the test compound is allowed to volatilize freely, the inhibition of growth as compared to the control plates is visually estimated and recorded as per cent control. The following data were obtained:

Xanthyl disulfides:
  506 ------------------------------------- 90

*Nematocidal test*

Small portions of dried tomato stems containing heavy infestation of root-knot type nematodes (*Meloidogyne sp.*) were imbedded in 600 gm. of loam soil and sealed in quart Mason jars. The compounds are thoroughly mixed with the soil in each jar, being first adsorbed on coarse sand. The concentration is 160 p. p. m. After 48 hours' fumigation, the soil from each jar is placed in a 4½" unglazed clay pot and removed to the greenhouse. After cautious watering for seven days, tomato transplants are placed in each pot. These plants are removed after a minimum of 21 days, the roots are washed, and an index of infection recorded. Control is expressed as a percentage, based on untreated checks. The following data were obtained:

| Compound | 160 p. p. m. |
|---|---|
| 506 | 100 |

*Mite test*

Potted pinto bean plants heavily infected with the two-spotted mite, *Tetranychus bimaculatus* (Harvey), were sprayed with various concentrations of the compounds under test in an aqueous suspension. Observations were made twelve days after spraying and the number of live mites counted. The results were expressed as a percentage based on untreated checks, 100 representing no live mites and "0" representing no control; the following data were obtained:

| Compound | Concentration | | |
|---|---|---|---|
| | 0.25% | .012% | 0.06% |
| 506 | | 65 | 40 | 20 |
| 553 | | | | 20 |
| 468 | | | | 40 |
| 470 | | 100 | 90 | 65 |
| 593 | | 90 | 40 | 20 |
| 566 | | 100 | 100 | 65 |
| 597 | | 100 | 65 | 20 |

The compounds of the present invention may be used to treat systemic fungus diseases: A culture of *Monilia albicans* obtained from the American Type Culture collection, known to cause both local and internal infections, was demonstrated to be lethal to albino mice. *Monilia albicans* isolated from a patient having fatal pulmonary moniliasis also proved fatal to albino mice. A mixture of these two strains was injected interperitoneally into albino mice and killed 6 out of 6 within 16 days.

Albino mice were picked at random, placed in groups, and inoculated with the standardized mixed *Monilia albicans* culture at a rate of 100,000 organisms per mouse as follows:

(Treatment was oral administration unless otherwise noted; dosage of N466 is expressed in milligrams per kilogram of body weight.)

| No. of Mice in Test Group | Type of Inoculation | Type of Treatment (N-466) |
|---|---|---|
| 11 | Intradermal-abdomen | 200 mg./kg. first day; 100 mg./kg. daily for 7 days. |
| 11 | do | 5% in mineral oil massaged daily. |
| 11 | do | None (control). |
| 12 | Intraperitoneal | 200 mg./kg. first day; 100 mg./kg. daily for 7 days. |
| 12 | do | None (control). |
| 11 | None (drug control) | 400 mg./kg. first day; 200 mg./kg. daily for 7 days. |

Forty-eight hours after injection it was observed that all animals inoculated intradermally showed evidence of moniliasis at the site of injection and treatment of all test groups with N-466 was begun.

Animals were examined at death or sacrificed at the end of thirty days. Extracts were taken from the lungs and peritoneum and cultured in Sabouraud's broth. Positive cultures were indicative of internal infection with the pathogenic organism. It was found that oral treatment with N-466 completely cured all internal infections when the pathogenic organism was applied either intradermally or interperitoneally, and in all but one case cutaneous treatment with N-466 prevented the migration of external infections to internal organs as shown in the following table:

| Type of Infection | Type of Treatment | Expected Positives[1] | Observed Positives | Percent Cure |
|---|---|---|---|---|
| Dermal | Oral | 6 | 0 | 100 |
| Do | Cutaneous | 6 | 1 | 83.3 |
| Interperitoneal | Oral | 9.1 | 0 | 100 |

[1] Based upon analysis of infection rates in control groups.

The compounds of the present invention may be employed as pesticides in a variety of ways.

For instance, the compounds of the present invention may be applied to plants as dispersions of wettable powder. Such a wettable powder may contain about equal parts by weight of a compound such as 506 and Attaclay, a finely divided clay, with a small quantity of a suitable wetting agent such as 2% Vatsol OT, a sulfonated alcohol wetting agent. The materials are ground together to produce a finely divided powder which may be stored and shipped in this form and added to water in the field to form a stable dispersion. Ordinarily, sufficient powder would be added to water to produce a concentration of from about 0.02% to 0.5% of 5–6 in a sprayable dispersion.

Another method of application of the compounds of the present invention is as a dust. For this purpose, the concentration of the active ingredient may vary from about 1% to 50% in the inert carrier. Suitable inert carriers include diatomacaous earth, bentonite, volcanic ash, talc, lignocellulosic flour, sulfur or mixtures of these. One typical composition contains 5% of 474 and the balance pyrophyllite.

For many purposes, the compounds of the present invention may advantageously be applied as solutions in organic solvents. For instance, for impregnating fruit wrappers or boxes, one may prepare a 25% solution of 553 in acetone or ethanol and dip the articles to be treated in such a solution.

The compounds of the present invention are viscous liquids and therefore should be placed in solution before one attempts to make emulsions of them. Emulsions may be easily prepared by making up a solution of the compounds in an organic solvent which is insoluble in water, such as xylene. Suitable wetting and dispersing agents can be added to solution and the solution then emulsified in water. As typical example, 25% of 468 is dissolved in xylene and there is added thereto about 2% of Duponol 51, a sulfated higher aliphatic alcohol wetting agent. The solution may be readily dispersed in water and ordinarily would be dispersed to a concentration of about 0.02 to 0.5% of the 468 in the finished emulsion.

We claim:

1. The method of killing pests comprising applying to a pest habitat as the sole pesticidal agent a compound having the formula

wherein X is a member selected from the group consisting of oxygen and sulfur and R is a member chosen from the group consisting of aliphatic radicals of from 1 to 18 carbon atoms, cycloparaffin radicals, aryl radicals and aralkyl radicals.

2. The method of killing pests comprising applying to a pest habitat as the sole pesticidal agent a compound having the formula

wherein X is a member chosen from the group consisting of oxygen and sulfur and R is an aliphatic radical having from 1 to 8 carbon atoms.

3. The method of killing pests comprising applying to a pest habitat as the sole pesticidal agent, methyl xanthogen tetrasulfide.

4. The method of killing pests comprising applying to a pest habitat as the sole pesticidal agent, n-propyl xanthogen tetrasulfide.

5. The method of killing pests comprising applying to a pest habitat as the sole pesticidal agent, n-octyl xanthogen tetrasulfide.

6. The method of killing pests comprising applying to a pest habitat as the sole pesticidal agent, tert dodecyl dithiocarbonyl tetrasulfide.

7. The method of killing pests comprising applying to a pest habitat as the sole pesticidal agent, allyl xanthogen tetrasulfide.

References Cited in the file of this patent

UNITED STATES PATENTS 2,250,545    Mikeska _____ July 29, 1941